(12) United States Patent
Duhamel et al.

(10) Patent No.: US 12,553,242 B2
(45) Date of Patent: Feb. 17, 2026

(54) ROOFING MEMBRANE WITH PROTECTIVE FILM

(71) Applicant: SIKA TECHNOLOGY AG, Baar (CH)

(72) Inventors: Albert J. Duhamel, Tiverton, RI (US); Brian J. Whelan, Canton, MA (US)

(73) Assignee: SIKA TECHNOLOGY AG, Baar (CH)

( * ) Notice: Subject to any disclaimer, the term of this patent is extended or adjusted under 35 U.S.C. 154(b) by 254 days.

(21) Appl. No.: 18/143,690

(22) Filed: May 5, 2023

(65) Prior Publication Data
US 2023/0358046 A1 Nov. 9, 2023

(30) Foreign Application Priority Data
May 6, 2022 (EP) ..................................... 22172055

(51) Int. Cl.
| | |
|---|---|
| *B32B 27/32* | (2006.01) |
| *B32B 25/08* | (2006.01) |
| *B32B 27/08* | (2006.01) |
| *B32B 27/30* | (2006.01) |
| *B32B 27/36* | (2006.01) |
| *B32B 37/06* | (2006.01) |
| *B32B 37/18* | (2006.01) |
| *E04D 5/06* | (2006.01) |
| *E04D 5/14* | (2006.01) |

(52) U.S. Cl.
CPC ................ *E04D 5/06* (2013.01); *B32B 25/08* (2013.01); *B32B 27/08* (2013.01); *B32B 27/304* (2013.01); *B32B 27/322* (2013.01); *B32B 27/36* (2013.01); *B32B 37/06* (2013.01); *B32B 37/182* (2013.01); *B32B 2307/7265* (2013.01); *B32B 2307/7376* (2023.05); *B32B 2307/748* (2013.01); *B32B 2419/06* (2013.01); *E04D 5/148* (2013.01); *E04D 5/149* (2013.01)

(58) Field of Classification Search
CPC .... E04D 5/00; E04D 5/06; E04D 7/00; E04D 5/148; E04D 5/149; B32B 25/00; B32B 25/08; B32B 27/08; B32B 27/304; B32B 27/322; B32B 37/36; B32B 37/06; B32B 37/182; B32B 2307/7376; B32B 307/7265; B32B 2307/748; B32B 2419/06
See application file for complete search history.

(56) References Cited

U.S. PATENT DOCUMENTS

| | | | | |
|---|---|---|---|---|
| 4,442,148 | A | * | 4/1984 | Stierli ..................... B32B 27/32 |
| | | | | 428/509 |
| 4,610,902 | A | * | 9/1986 | Eastman ............... B32B 27/304 |
| | | | | 428/184 |

(Continued)

FOREIGN PATENT DOCUMENTS

EP 2 647 778 A2 10/2013

*Primary Examiner* — Chi Q Nguyen
(74) *Attorney, Agent, or Firm* — Oliff PLC

(57) ABSTRACT

A roofing membrane composite includes a roofing membrane and a protective film removable affixed to a top major surface of the roofing membrane without an adhesive layer between the protective film and the roofing membrane, wherein the protective film includes at least one layer with at least one polyolefin. A method for producing a roofing membrane composite and a method for waterproofing a roof substrate.

14 Claims, 5 Drawing Sheets

(56) References Cited

U.S. PATENT DOCUMENTS

| | | | |
|---|---|---|---|
| 8,925,272 B1* | 1/2015 | Amatruda | E04D 1/2963 |
| | | | 52/557 |
| 9,951,253 B2 | 4/2018 | Engelhard | |
| 2004/0103608 A1* | 6/2004 | Lionel | B32B 13/04 |
| | | | 52/408 |
| 2005/0202197 A1* | 9/2005 | Mohseen | C09J 7/38 |
| | | | 428/40.1 |
| 2009/0291249 A1* | 11/2009 | Mehta | E04D 5/10 |
| | | | 428/522 |
| 2020/0270866 A1 | 8/2020 | Yancey et al. | |
| 2021/0156150 A1* | 5/2021 | Boss | E04D 3/366 |
| 2021/0379876 A1* | 12/2021 | Boss | B32B 27/308 |
| 2022/0098866 A1* | 3/2022 | Yang | B32B 27/302 |
| 2023/0065390 A1* | 3/2023 | Jones | B32B 37/203 |
| 2023/0228093 A1* | 7/2023 | Kortmeyer | E04D 1/34 |
| | | | 52/746.11 |
| 2023/0235574 A1* | 7/2023 | Hoffman | B32B 27/08 |
| | | | 428/319.3 |
| 2024/0262082 A1* | 8/2024 | Geoffrion | B32B 5/022 |

\* cited by examiner

ROOFING MEMBRANE WITH PROTECTIVE FILM

TECHNICAL FIELD

The invention relates to polymeric roofing membranes, which can be used for waterproofing above ground constructions, in particular for waterproofing of roof structures.

BACKGROUND OF THE INVENTION

In the field of construction polymeric sheets, which are often referred to as membranes, panels, or sheets, are used to protect underground and above ground constructions, such as basements, tunnels, and flat and low-sloped roofs, against penetration water. Waterproofing membranes are applied, for example, to prevent ingress of water through cracks that develop in concrete structures due to building settlement, load deflection, or concrete shrinkage. Roofing membranes used for waterproofing of flat and low-sloped roof structures are typically provided as single-ply or multi-ply membrane systems. In a single-ply system, the roof substrate is covered using a roofing membrane composed of a single waterproofing layer. In this case, the waterproofing layer typically contains a reinforcement layer to increase the mechanical stability of the roofing membrane.

In multi-ply membrane systems, roofing membranes comprising multiple waterproofing layers having similar or different composition are used. Single-ply membranes have the advantage of lower production costs compared to the multi-ply membranes, but they are also less resistant to mechanical damages caused by punctures of sharp objects.

Commonly used materials for roofing membranes include plastics, in particular thermoplastics such as plasticized polyvinylchloride (p-PVC), thermoplastic elastomers (TPE), in particular thermoplastic olefins (TPO), and elastomers such as ethylene-propylene diene monomer (EPDM). The roofing membranes are typically delivered to a construction site in rolls, transferred to the place of installation, unrolled, and adhered to the substrate to be waterproofed. The substrate on which the roofing membrane is adhered may be comprised of variety of materials depending on the installation site. The substrate may be, for example, a concrete, metal, or wood deck, or it may include an insulation board, a cover board and/or an existing roofing membrane.

Roofing membranes must be securely fastened to the roof substrate to provide sufficient mechanical strength to resist the shearing forces applied on it due to high wind loads. Roof systems are typically divided into two categories depending on the means used for fastening the roofing membrane to roof substrate. In a mechanically attached roof system, the roofing membrane is fastened to the roof substrate by using screws and/or barbed plates. Mechanical fastening enables high strength bonding, but it provides direct attachment to the roof substrate only at locations where a mechanical fastener affixes the membrane to the surface, which makes mechanically attached membranes susceptible to flutter. In fully-adhered roof systems the membrane is typically adhered to the roof substrate indirectly by using an adhesive composition.

In order to create a continuous waterproofing seal on the surface of a roof substrate, the edges of adjacent roofing membranes can be overlapped to form sealable joints. These joints can then be sealed by bonding the bottom surface of the first overlapping edge portion of the first membrane with the top surface of a second overlapped edge portion of the second membrane. The choice of the technique used for bonding of the edge portions of the adjacent membranes depends on the type of the membranes. Membranes composed of thermoplastic or non-crosslinked elastomeric materials can be bonded to each other by heat-welding. In case of self-adhering membranes, a narrow section near the long edges of the membrane is typically left free of the adhesive in order to enable joining of the overlapped edge portions by heat-welding. The overlapped edge portions of membranes can also be bonded to each other by using another adhesive.

The roofing membranes are available in variety of different colors, but most membranes are either white or black. Black membranes are typically used in cold climate regions whereas white membranes are used to minimize the amount of heat energy absorbed in the roof structure in warm regions. The roofing membranes are applied to the roof substrate in form of broad sheets having a length of several times the width. The installation work is conducted manually and depending on the size of the roof, it can take several days to cover the whole roof with the sheets. The top surfaces of already installed sheets are susceptible to environmental conditions, particularly to mechanical impacts and fouling. Furthermore, it is not uncommon that the roofers walk on the already installed membrane sheets while the installation work is in progress. However, especially white membranes should remain as clean as possible until the roof is taken into use to provide the roof with the desired aesthetic appearance and reflectiveness that required for the energy saving properties. Typically, the surface of the roof must be cleaned after the installation process to avoid customer complaints, which increases installation time and costs.

One of the obvious solutions to protect the membranes during roofing work is to cover the already installed membrane sheets with temporary protective sheets, such as tarps. However, applying the protective sheets adds a further step to the installation process resulting in significant increase of costs. There is thus a need for a new type of roofing membrane, which enables keeping the surfaces of already installed roofing membranes clean until the roofing work has been completed.

SUMMARY OF THE INVENTION

The object of the present invention is to provide a roofing membrane and method for waterproofing a roof substrate that ensures that the sheets of the roofing membrane are protected against environmental impacts, particularly fouling and mechanical impacts, until the installation work has been completed and the roof has been taken into use.

It was surprisingly found out that the that these objects can be achieved with a roofing membrane composite comprising a roofing membrane and a protective film removably affixed the top surface of the roofing membrane without using an adhesive layer.

The subject of the present invention is a roofing membrane composite as defined in claim 1.

One of the advantages of the roofing membrane composite of the present invention is that no post cleaning of the roof or installation of temporary protecting sheets, such as tarps, is needed to protect the roofing membranes from fouling or mechanical impacts during the installation process. Consequently, use of the inventive roofing membrane composite enables significant savings in terms of time and labor costs.

Another advantage of the present invention is that no adhesive residues are left to the surface of the roofing membrane after the protective film has been removed since the protective film has been adhered to the membrane without using any adhesives. Furthermore, due to the polyolefin basis, the protective films removed during installation of the roofing membrane can be easily recycled.

Other aspects of the present invention are presented in other independent claims. Preferred aspects of the invention are presented in the dependent claims.

DETAILED DESCRIPTION OF THE INVENTION

Figure 1:
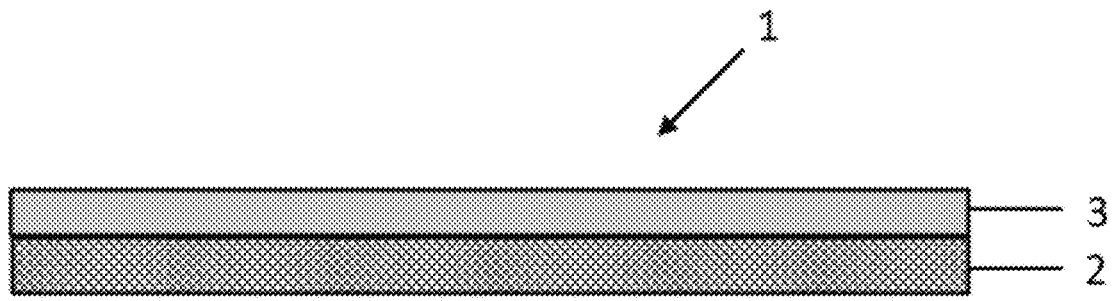
FIG. 1 shows a cross-section of a roofing membrane composite (1) comprising a roofing membrane (2) and a one-layer protective film (3), which is removable affixed to the top major surface of the roofing membrane (2).

The subject of the present invention is a roofing membrane composite (1) comprising:
a) A roofing membrane (2) and
b) A protective film (3) removably affixed to a top major surface of the roofing membrane (2) without an adhesive layer between the protective film (3) and the roofing membrane (2),
wherein the protective film (3) comprises at least one layer comprising at least one polyolefin, preferably selected from polyethylene, ethylene copolymer, and polypropylene, propylene copolymer.

Substance names beginning with "poly" designate in the present document substances which formally contain, per molecule, two or more of the functional groups occurring in their names. For instance, a polyol refers to a compound having at least two hydroxyl groups. A polyether refers to a compound having at least two ether groups.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "elastomer" refers to any polymer or combination of polymers, which is capable of recovering from large deformations, and which can be, or already is, modified to a state in which it is essentially insoluble (but can swell) in a boiling solvent. Typical elastomers are capable of being elongated or deformed to at least 200% of their original dimension under an externally applied force, and will substantially resume the original dimensions, sustaining only small permanent set (typically no more than about 20%), after the external force is released. As used herein, the term "elastomer" may be used interchangeably with the term "rubber."

The term "α-olefin" designates an alkene having the molecular formula $C_xH_{2x}$ (x corresponds to the number of carbon atoms), which features a carbon-carbon double bond at the first carbon atom (α-carbon). Examples of α-olefins include ethylene, propylene, 1-butene, 2-methyl-1-propene (isobutylene), 1-pentene, 1-hexene, 1-heptene and 1-octene. For example, neither 1,3-butadiene, nor 2-butene, nor styrene are referred as "α-olefins" according to the present disclosure.

The "amount or content of at least one component X" in a composition, for example "the amount of the at least one polyolefin" refers to the sum of the individual amounts of all polyolefins contained in the composition. For example, in case the composition comprises 20 wt.-% of at least one polyolefin, the sum of the amounts of all polyolefins contained in the composition equals 20 wt.-%.

The term "normal room temperature" refers to the temperature of 23° C.

The roofing membrane and the protective film are sheet-like elements having top and bottom major surfaces defined by peripheral edges and defining a thickness there between. Typically, the width and length of a sheet-like element are several times greater than the thickness of the element, such as at least 15 times, preferably at least 25 times, more preferably at least 50 times greater than the thickness of the element.

The roofing membrane can be a single- or multi-ply-membrane. The term "single-ply membrane" designates in the present document membranes comprising one single layer, particularly a waterproofing layer, whereas the term "multi-ply membrane refers to membranes comprising more than one layer, particularly waterproofing layers, having same or different compositions. Single- and multi-ply membranes are known to a person skilled in the art and they may be produced by any conventional means, such as by way of extrusion or co-extrusion, calendaring, or by spread coating. In case of a multi-ply membrane, the term "top major surface of a roofing membrane" refers to the outermost major surface of the membrane facing the bottom surface of the protective film.

In the context of the present invention, the expression "removably affixed" is understood to mean that the protective film can be separated from the roofing membrane without deteriorating the physical integrity of the film or membrane and without conducting any additional steps, such as subjecting the protective film and/or the membrane to chemical or physical treatments, for example, heating. It is preferred that the interlayer bond strength between the protective film and the roofing membrane is sufficiently high to keep the layers attached to each other during transportation and installation of the roofing membrane composite (roofing) but also low enough such that the protective film can be manually removed without using excessive force.

Preferably, the interlayer peel strength between the protective film and the roofing membrane is not more than 15 N/50 mm, more preferably not more than 10 N/50 mm, even more preferably not more than 7.5 N/50 mm and/or preferably at least 0.5 N/50 mm, more preferably at least 1 N/50 mm, even more preferably at least 2 N/50 mm. The term "interlayer peel strength" refers to the average peeling resistance (N) per 50 mm of the protective film upon peeling the protective film from one edge at an angle of 90° from the roofing membrane. The interlayer peel resistance can be measured using the T-peel resistance test according to ISO 11339:2010 standard.

The protective film, which can be a single- or multi-layer film, comprises at least one layer comprising at least one polyolefin. Term "polyolefin" refers in the present disclosure to homopolymers and copolymers obtained by polymerization of olefin monomers optionally with other types of monomers.

Preferably, the at least one polyolefin is selected from polyethylene, ethylene copolymer, and polypropylene, propylene copolymer.

Suitable polyethylenes for use as the at least one polyolefin include very-low-density polyethylene, low-density polyethylene, linear low-density polyethylene, medium-density polyethylene, high-density polyethylene, and ultra-high-molecular-weight polyethylene, particularly low-density polyethylene, linear low-density polyethylene, medium-density polyethylene, high-density polyethylene, preferably having a melting temperature ($T_m$) determined by differential scanning calorimetry (DSC) according to ISO 11357-3:2018 standard using a heating rate of 2° C./min of at or above 85° C., preferably at or above 95° C., more preferably at or above 105° C.

Further suitable polyethylenes include grafted polyethylenes, such as maleic anhydride grated polyethylenes. These commercially available, for example, under the trade name of Fusabond® (from Dow Chemicals), under the trade name of Lucalen® (from LyondellBasell), and under the trade name of Orevac® (from Arkema).

Suitable ethylene copolymers for use as the at least one polyolefin include random and block copolymers of ethylene and one or more $C_3$-$C_{20}$ α-olefin monomers, particularly one or more of propylene, 1-butene, 1-pentene, 1-hexene, 1-heptene, 1-octene, 1-decene, 1-dodecene, and 1-hexadodecene, preferably comprising at least 60 wt.-%, more preferably at least 65 wt.-% of ethylene-derived units, based on the weight of the copolymer.

Suitable ethylene copolymers include polyolefin plastomers, which are commercially available, for example, under the trade name of Affinity®, such as Affinity® EG 8100G, Affinity® EG 8200G, Affinity® SL 8110G, Affinity® KC 8852G, Affinity® VP 8770G, and Affinity® PF 1140G (all from Dow Chemical Company); under the trade name of Exact®, such as Exact® 3024, Exact® 3027, Exact® 3128, Exact® 3131, Exact® 4049, Exact® 4053, Exact® 5371, and Exact® 8203 (all from Exxon Mobil); and under the trade name of Queo® (from Borealis AG). Further suitable ethylene copolymers include ethylene-based polyolefin elastomers (POE), which are commercially available, for example, under the trade name of Engage®, such as Engage® 7256, Engage® 7467, Engage®7447, Engage® 8003, Engage® 8100, Engage® 8480, Engage® 8540, Engage® 8440, Engage® 8450, Engage® 8452, Engage® 8200, and Engage® 8414 (all from Dow Chemical Company).

Suitable ethylene-α-olefin block copolymers are commercially available, for example, under the trade name of Infuse®, such as Infuse® 9100, Infuse® 9107, Infuse® 9500, Infuse® 9507, and Infuse® 9530 (all from Dow Chemical Company).

Suitable polypropylenes for use as the at least one polyolefin include, for example, isotactic polypropylene (iPP), syndiotactic polypropylene (sPP), and homopolymer polypropylene (hPP), preferably having a melting temperature ($T_m$) determined by differential scanning calorimetry (DSC) according to ISO 11357-3:2018 standard using a heating rate of 2° C./min of at or above 100° C., preferably at or above 105° C., more preferably at or above 110° C.

Further suitable polypropylenes include grafted polypropylenes, such as maleic anhydride grated polypropylenes. These commercially available, for example, under the trade name of Hypalon® (from Dow Chemicals) and under the trade name of Orevac® (from Arkema).

Suitable propylene copolymers for use as the at least one polyolefin include propylene-ethylene random and block copolymers and random and block copolymers of propylene and one or more $C_4$-$C_{20}$ α-olefin monomers, in particular one or more of 1-butene, 1-pentene, 1-hexene, 1-heptene, 1-octene, 1-decene, 1-dodecene, and 1-hexadodecene, preferably comprising at least 60 wt.-%, more preferably at least 65 wt.-% of propylene-derived units, based on the weight of the copolymer.

Suitable propylene random and block copolymers are commercially available, for example, under the trade names of Intune®, and Versify (from Dow Chemical Company) and under the trade name of Vistamaxx® (from Exxon Mobil).

According to one or more embodiments, the protective film comprises a contact layer comprising at least 50 wt.-%, preferably at least 75 wt.-%, more preferably at least 85 wt.-%, even more preferably at least 95 wt.-%, based on the total weight of the contact layer, of at least one ethylene-based polymer, preferably polyethylene and/or ethylene copolymer, more preferably polyethylene.

Preferably, the contact layer is directly connected over at least a portion of its bottom major surface to the top major surface of the roofing membrane. The expression "directly connected" is understood to mean in the context of the present invention that no further layer or substance, such as a connecting layer, is present between the layers, and that the opposing surfaces of the two layers are directly connected, particularly bonded to each other. At the transition area between the two layers, the materials forming the layers can also be present mixed with each other.

The use of an ethylene-based contact layer in the protective film has turned out to be especially advantageous with polyvinylchloride-based roofing membranes. Due to the partial incompatibility of polyvinylchloride and ethylene-based polymers, the protective film can be removable affixed to a surface of the roofing membrane by using thermal bonding means, such as thermal lamination techniques. The interlayer peel strength between an ethylene-based contact layer and PVC-based roofing membrane has been found out to be sufficiently high to keep the layers affixed to each other during transportation and roofing work but also low enough such that the protective film can be manually removed without using excessive force.

The protective film can be composed of the contact layer. However, it may be advantageous that the protective film comprises further layers, for example, to improve the mechanical stability of the protective film.

Figure 2:
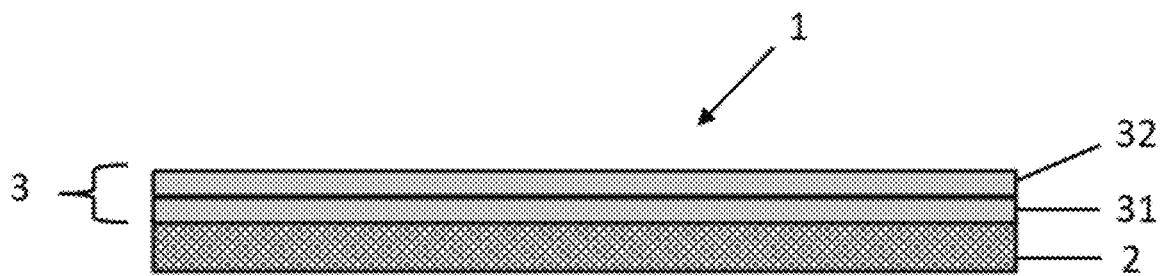
FIG. 2 shows a cross-section of a roofing membrane composite (1) according to one embodiment of the present invention, wherein a two-layer protective film (3) composed a contact layer (31) and an additional layer (32) is removably affixed to the top major surface of the roofing membrane (2).

According to one or more embodiments, the protective film comprises at least two layers, preferably at least three layers, more preferably at least four layers. In case of multi-layer films, the bottom layer facing the top major surface of the roofing membrane is considered to be the contact layer. FIG. 2 shows a cross-section of a roofing membrane composite (1) comprising a roofing membrane (2) and a protective film (3) composed of a contact layer (31) and an additional layer (32), wherein the contact layer (31) is directly connected over at least a portion of its bottom major surface to the top major surface of the roofing membrane (2).

The detailed composition of the additional layers of the protective film is not particularly restricted but it may be preferred that the polymers contained in the additional layers are compatible with the polymers of the contact layer to enable bonding of the individual layers to each other without the use of adhesives.

According to one or more embodiments, each layer of the protective film comprises at least one polyolefin, preferably selected from polyethylene, ethylene copolymer, and polypropylene, propylene copolymer.

According to one or more preferred embodiments, each layer of the protective film comprises at least 50 wt.-%, preferably at least 75 wt.-%, more preferably at least 85 wt.-%, even more preferably at least 95 wt.-%, based on the total weight of the layer, of at least one ethylene-based polymer, preferably polyethylene and/or ethylene copolymer, more preferably polyethylene.

Preferably, the protective film has a thickness of not more than 500 μm, more preferably not more than 350 μm, more preferably not more than 250 μm. The thickness of the protective film is not particularly restricted, but it should be high enough to provide the protective film with the mechanical stability that is required for the protective film to perform its function, i.e., to effectively protect the roofing membrane during the installation process from environmental impacts. On the other hand, the thickness of the protective film should be kept as low as possible to minimize the amount of material that must be recycled after the roofing work.

According to one or more embodiments, the protective film has a thickness of 10-200 μm, preferably 25-150 μm, more preferably 35-125 μm, even more preferably 45-100 μm. Protective films having a thickness in the above cited ranges have been found out to be especially suitable for use in the present invention since they exhibit sufficient mechanical stability enabling their use in protecting the roofing membrane from fouling and other environmental factors while not having a significant impact on the production and material costs of the roofing membrane.

The width of the protective film depends mainly on the width of the roofing membrane to be protected. According to one or more embodiments, the protective film has a width of 0.5-5 m, preferably 1-4 m, more preferably 1.5-3.5 m, even more preferably 2-3.5 m.

The protective film is preferably a blown film or a cast film. In case the protective film is a multilayer film, it can be prepared, for example, by adhesive lamination or by co-extrusion, such as by blown film co-extrusion.

According to one or more embodiments, the protective film has:
  a tensile strength at break measured in machine direction (MD) of at least 2.5 MPa, preferably at least 5 MPa, more preferably at least 10 MPa and/or nor more than 50 MPa, preferably not more than 35 MPa, more preferably not more than 25 MPa and/or
  an elongation at break measured in machine direction (MD) of at least 100%, preferably at least 150%, more preferably at least 250% and/or not more than 1000%, preferably not more than 750%, more preferably not more than 500%.

It may further be preferred that the roofing membrane composite is provided with selvage edges or with features that enable formation of the selvage edges at the construction site. The term "selvage edge" refers in the context of the present invention to edge portions of the roofing membrane that are typically left free of any other layers to enable bonding of the overlapped portions of sheet of the roofing membrane to each other by using adhesive bonding or heat-welding means.

Figure 3:
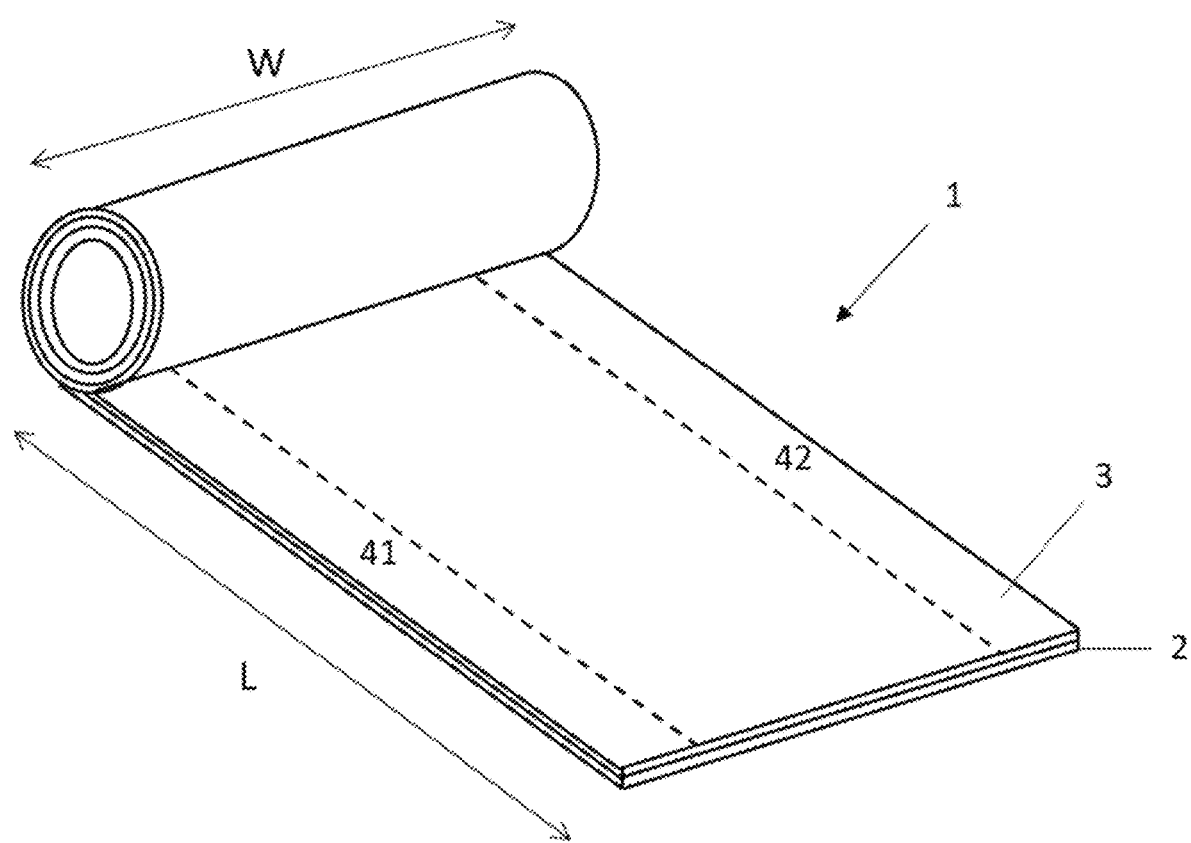
FIG. 3 shows a perspective view of a roofing membrane composite (1) comprising a roofing membrane (2) having a width (W) defined between long edges of the composite (1) and a protective film (3), which is removable affixed to the top major surface of the roofing membrane (2). The protective film (3) comprises edge sections (41, 42) limited by the long edges and perforations running in the longitudinal direction (L) of the protective film (3).

According to one or more embodiments, the protective film contains perforations along the long and/or short edges of the protective film to allow the edge sections of the protective film to be easily removed. A roofing membrane composite (1) having a protective film (3) with perforations and edge sections (41, 42) running along the long edges of the protective film (3) is shown in FIG. 3. The edge sections of the protective film can be removed during the installation process to expose edge portions of the roofing membrane and thus to enable bonding of the overlapped edge portions of adjacent sheets of the roofing membrane to each other, for example, by heat-welding, to form a sealed joint.

According to one or more embodiments, at least one of the long edge portions and/or at least one of the short edge portions of the roofing membrane is left free of the protective film. The expression "free of the protective liner" is understood to mean that the respective edge portions are not covered with the protective film. According to one or more preferred embodiments, only one of the long edge portions is left free of the protective film and/or only one of the short edge portions is left free of the protective film.

Figure 4:
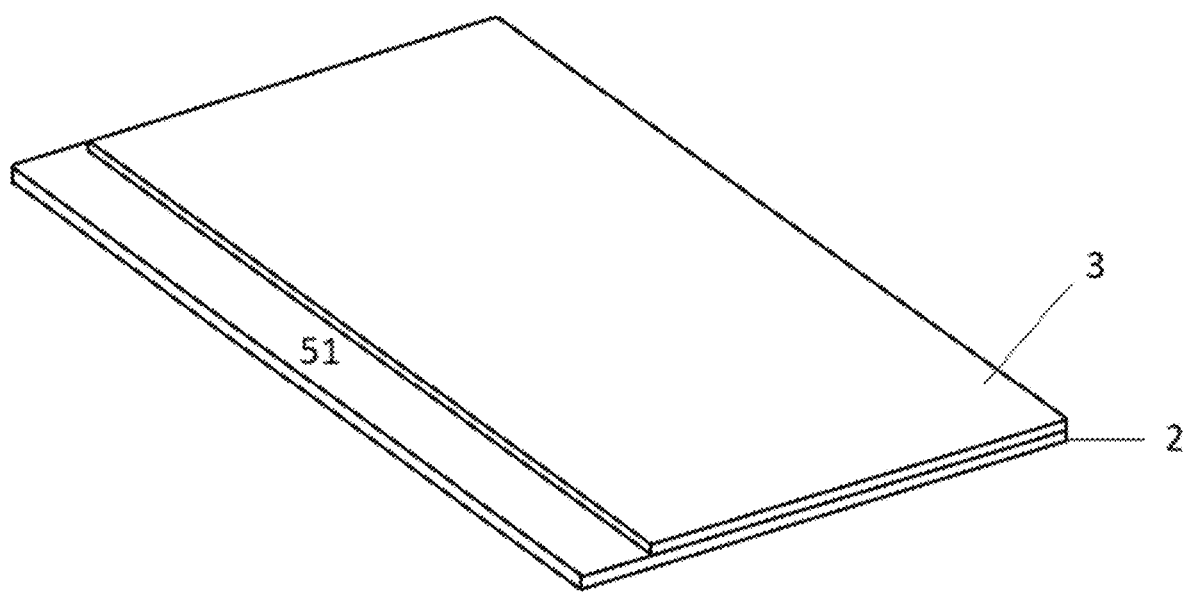
FIG. 4 shows a perspective view of a sheet of a roofing membrane composite (1) comprising a roofing membrane (2) and a protective film (3), which is removable affixed to the top major surface of the roofing membrane (2). The roofing membrane comprises a selvage edge (51) extending along the long edge of the membrane (2), which is not covered with the protective film (3).
Figure 5:
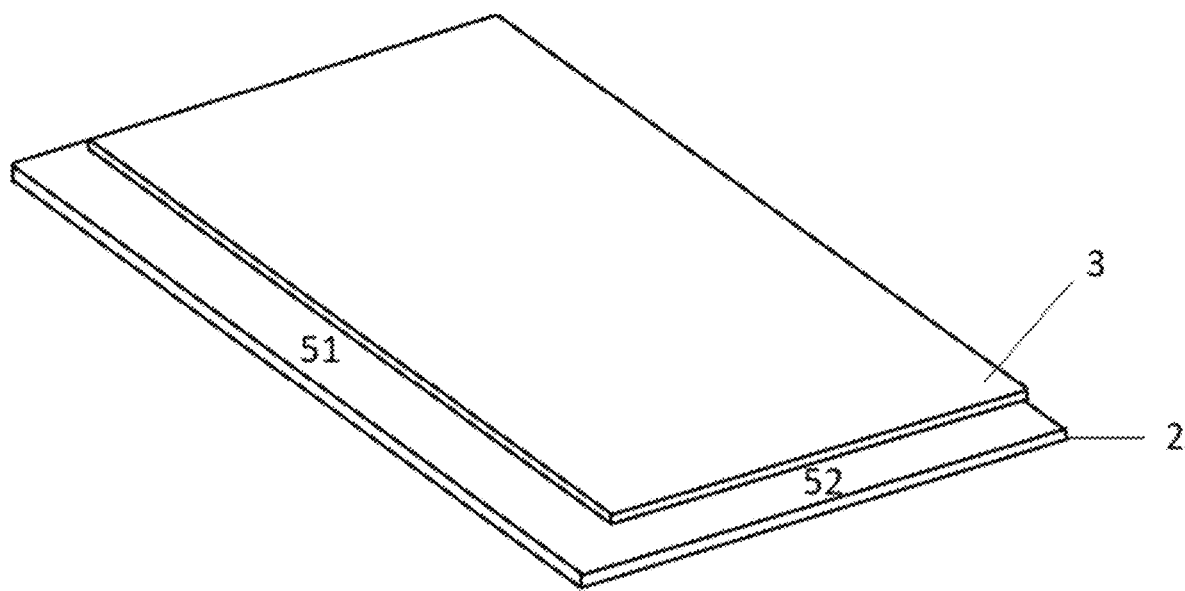
FIG. 5 shows a perspective view of a sheet of a roofing membrane composite (1) comprising a roofing membrane (2) and a protective film (3), which is removable affixed to the top major surface of the roofing membrane (2). The roofing membrane comprises a first selvage edge (51) extending along a long edge of the membrane (2) and a second selvage edge (52) extending along a short edge of the membrane (2), wherein the selvage edges are not covered with the protective film (3).

A sheet of a roofing membrane composite having a longitudinal selvage edge (51) and a sheet having a longitudinal (51) and a transverse selvage edge (52) are shown in FIGS. 4 and 5, respectively. Roofing membrane composites having at least one pre-formed longitudinal selvage edge can be provided, for example, using a protective film having smaller width than the width of the roofing membrane. On the other hand, short edge portions of the roofing membrane can be left free of the protective liner, for example, by removing the respective portions of the protective film during the production of the roofing membrane composite. The removal of the short edge portions of the protective film can be envisioned to take place after the produced membrane composite has been winded into a roll and cut into a desired length.

The depth of the selvage edges, i.e., the width of the edge portion of the roofing membrane that is free of the protective film, is preferably at least 5 cm, more preferably at least 7.5 cm and/or preferably not more than 50 cm, more preferably not more than 35 cm.

According to one or more embodiments, the roofing membrane comprises at least one polymer selected from polyvinylchloride, polyolefin, halogenated polyolefin, rubber, and ketone ethylene ester.

Suitable PVC resins for use in the roofing membrane include the ones having a K-value determined by using the method as described in ISO 1628-2-1998 standard in the range of 50-85, preferably 65-75. The K-value is a measure of the polymerization grade of the PVC-resin, and it is determined from the viscosity values of the PVC homopolymer as virgin resin, dissolved in cyclohexanone at 30° C.

Suitable polyolefins for use in the roofing membrane include, for example, polyethylene, ethylene copolymers, polypropylene, propylene copolymers. Especially suitable polyolefins include thermoplastic polyolefin elastomers (TPO-E), particularly heterophasic propylene copolymers. Heterophasic polymers are polymer systems comprising a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier.

Suitable commercially available heterophasic propylene copolymers include reactor blends of the base polyolefin and the polyolefin modifier, also known as "in-situ TPOs" or "reactor TPOs or "impact copolymers (ICP)", which are typically produced in a sequential polymerization process, wherein the components of the matrix phase are produced in a first reactor and transferred to a second reactor, where the components of the dispersed phase are produced and incorporated as domains in the matrix phase. Heterophasic propylene copolymers comprising polypropylene homopolymer as the base polymer are often referred to as "heterophasic propylene copolymers (HECO)" whereas heterophasic propylene copolymers comprising polypropylene random copolymer as the base polymer are often referred to as "heterophasic propylene random copolymers (RAHECO)". The term "heterophasic propylene copolymer" encompasses in the present disclosure both the HECO and RAHECO types of the heterophasic propylene copolymers.

Suitable rubbers for use in the roofing membrane include, for example, styrene-butadiene rubber (SBR), ethylene propylene diene monomer (EPDM), butyl rubber, polyisoprene, polybutadiene, natural rubber, polychloroprene rubber, ethylene-propylene rubber (EPR), nitrile rubber, acrylic rubber, and silicone rubber, and chemically crosslinked versions of the aforementioned rubbers.

According to one or more embodiments, the roofing membrane comprises at least at least 35 wt.-%, preferably at least 45 wt.-%, more preferably at least 55 wt.-%, based on the total weight of the roofing membrane, of the at least one polymer selected from polyvinylchloride, polyolefin, halogenated polyolefin, rubber, and ketone ethylene ester, preferably from polyvinylchloride, polyolefin, and rubber, more from preferably polyvinylchloride resin and polyolefin, even more preferably from polyvinylchloride resin, polypropylene, and propylene copolymers, still more preferably from polyvinylchloride resin and heterophasic propylene copolymers.

According to one or more embodiments, the roofing membrane comprises at least one polyvinylchloride-based waterproofing layer comprising:
  25-65 wt.-% of a polyvinylchloride resin,
  15-50 wt.-% of at least one plasticizer for polyvinylchloride resin, and
  0-30 wt.-% of at least one inorganic filler, all proportions being based on the total weight of the waterproofing layer.

The type of the at least one plasticizer for polyvinylchloride resin is not particularly restricted in the present invention. Suitable plasticizers for the PVC-resin include but are not restricted to, for example, linear or branched phthalates such as di-isononyl phthalate (DINP), di-nonyl phthalate (L9P), diallyl phthalate (DAP), di-2-ethylhexyl-phthalate (DEHP), dioctyl phthalate (DOP), diisodecyl phthalate (DIDP), and mixed linear phthalates (911P). Other suitable plasticizers include phthalate-free plasticizers, such as trimellitate plasticizers, adipic polyesters, and biochemical plasticizers. Examples of biochemical plasticizers include epoxidized vegetable oils, for example, epoxidized soybean oil and epoxidized linseed oil and acetylated waxes and oils derived from plants, for example, acetylated castor wax and acetylated castor oil.

Particularly suitable phthalate-free plasticizers to be used in the waterproofing layer include alkyl esters of benzoic acid, dialkyl esters of aliphatic dicarboxylic acids, polyesters of aliphatic dicarboxylic acids or of aliphatic di-, tri- and tetrols, the end groups of which are unesterified or have been esterified with monofunctional reagents, trialkyl esters of citric acid, acetylated trialkyl esters of citric acid, glycerol esters, benzoic diesters of mono-, di-, tri-, or polyalkylene glycols, trimethylolpropane esters, dialkyl esters of cyclohexanedicarboxylic acids, dialkyl esters of terephthalic acid, trialkyl esters of trimellitic acid, triaryl esters of phosphoric acid, diaryl alkyl esters of phosphoric acid, trialkyl esters of phosphoric acid, and aryl esters of alkanesulphonic acids.

According to one or more embodiments, the at least one plasticizer for the PVC resin is selected from the group consisting of phthalates, trimellitate plasticizers, adipic polyesters, and biochemical plasticizers.

Suitable inorganic fillers for use in the waterproofing layer include sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites. The term "calcium carbonate" as inert inorganic filler refers in the context of the present document to calcitic fillers produced from chalk, limestone, or marble by grinding and/or precipitation.

According to one or more embodiments, the at least one inorganic filler is present in the waterproofing layer in an amount of 5-30 wt.-%, preferably 10-30 wt.-%, more preferably, 15-30 wt.-%, based on the total weight of the waterproofing layer.

The waterproofing layer can further comprise one or more additives, for example, UV- and heat stabilizers, antioxidants, flame retardants, dyes, pigments such as titanium dioxide and carbon black, matting agents, antistatic agents, impact modifiers, biocides, and processing aids such as lubricants, slip agents, antiblock agents, and denest aids.

The thickness of the roofing membrane is not particularly restricted. According to one or more embodiments, the roofing membrane has a thickness of 0.5-5 mm, preferably 0.75-4 mm, more preferably 1-3.5 mm, even more preferably 1.2-2.5 mm. A thickness of a polymeric layer can be determined, for example, by using the measurement method as defined in DIN EN 1849-2 standard.

According to one or more embodiments, the roofing membrane is a multi-ply membrane comprising, in addition to the waterproofing layer, a further waterproofing layer, wherein the waterproofing layer and the further waterproofing layer are preferably directly connected to each other over at least a portion of their opposing major surfaces. The composition of the further waterproofing layer may be same of different than the waterproofing layer. However, it is generally preferred that the waterproofing layers comprise the same polymer basis to ensure compatibility between the waterproofing layers.

It may further be preferred to include a reinforcing layer to the structure of the roofing membrane to improve mechanical properties of the membrane. The reinforcing layer may be fully embedded into the waterproofing layer or adhered to one of the major surfaces of the waterproofing layer. The expression "fully embedded" is understood to mean that the reinforcing layer is fully covered by the matrix of the waterproofing layer.

According to one or more embodiments, the roofing membrane comprises a reinforcing layer that is fully embedded into the waterproofing layer or adhered to one of the major surfaces of the waterproofing layer, wherein the reinforcing layer is selected from non-woven fabrics, woven fabrics, and laid scrims comprising synthetic organic and/or inorganic fibers.

The term "non-woven fabric" refers in the present disclosure to materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the nonwoven fabric. In chemical bonding, chemical binders such as adhesive materials are used to hold the fibers together in a non-woven fabric. Typical materials for the non-woven fabrics include synthetic organic and inorganic fibers.

The term "laid scrim" refers in the present disclosure web-like non-woven products composed of at least two sets of parallel yarns (also designated as weft and warp yarns), which lay on top of each other and are chemically bonded to each other. The yarns of a non-woven scrim are typically arranged with an angle of 60-120°, such as 90±5°, towards each other thereby forming interstices, wherein the interstices occupy more than 60% of the entire surface area of the laid scrim.

According to one or more embodiments, the synthetic organic fibers of the reinforcing layer are selected from polyethylene, polypropylene, polyester, nylon, and aramid fibers. According to one or more embodiments, the inorganic fibers of the reinforcing layer are selected from glass, carbon, metal, and wollastonite fibers.

The preferences given above for the roofing membrane and the protective film apply equally to all subjects of the present invention unless otherwise stated.

Another subject of the present invention is a method for producing a roofing membrane composite comprising steps of:
  Thermally laminating a protective film to all or part of the top major surface of a roofing membrane in a manner that gives direct bonding between the protective film and the roofing membrane or
  Extruding or co-extruding a melt-processed composition of a roofing membrane onto a surface of a protective film.

The melt-processed composition of a roofing membrane comprises all the constituents of the roofing membrane. In case the roofing membrane is a multi-ply membrane, for example, composed of two waterproofing layers, the extrusion step is preferably conducted by co-extruding the melt-processed compositions of the waterproofing layers.

The term "melt-processing" refers in the context of the present disclosure to a process, in which at least one molten polymeric component is intimately mixed with at least one other component, which may be another molten polymeric component or a solid component, such as a filler or an additive, until a melt blend, i.e., a substantially homogeneously mixed mixture of the polymeric component(s) and the other constituents is obtained. The melt processing can be conducted as a batch process using any conventional mixer, such as a Brabender, Banbury, or roll mixer or as continuous process using a continuous type of mixer, such as an extrusion apparatus comprising an extruder, preferably a single screw or a twin screw extruder. Preferably, the melt-processing step is conducted using a continuous type of mixer, in particular an extrusion apparatus comprising an extruder and extruder die.

In the extrusion step of the method, part of the thermal energy of the extruded shaped melt is introduced on the surface of the protective film resulting in partial melting of the protective film, which after cooling is directly bonded with the roofing membrane. The strength of the bond between the protective film and the roofing membrane can be increased, if needed, by conducting the bonding and/or cooling under pressure. For example, the roofing membrane composite obtained from the extrusion step can further be drawn through spaced apart calender cooling rolls.

According to one or more preferred embodiments, the method for producing a roofing membrane composite comprises steps of providing a roofing membrane and a protective film and thermally laminating the protective film to all or part of the top major surface of a roofing membrane in a manner that gives direct bonding between the protective film and the roofing membrane.

Thermal lamination of the protective film to the roofing membrane can be conducted by using any conventional means, such as heated calendaring rolls and/or lamination wheels or hot-pressing means.

Figure 6:
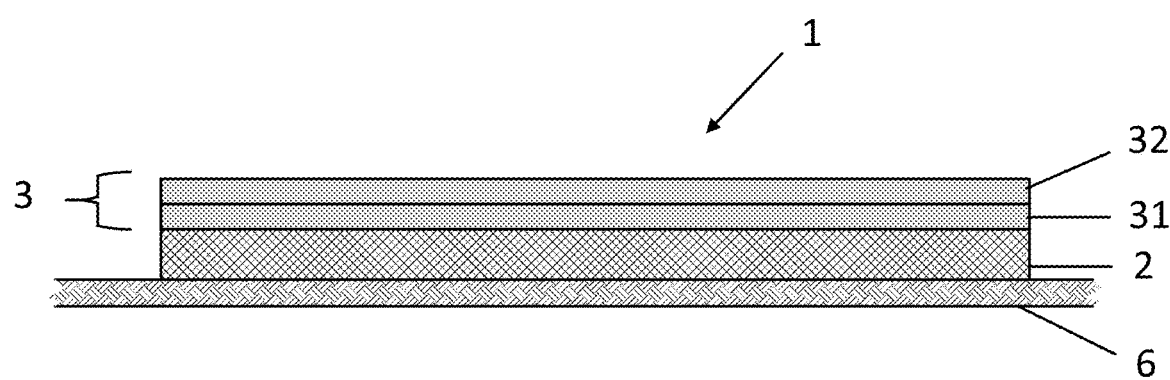
FIG. 6 shows a perspective view of a sheet of a roofing membrane composite (1) applied to a roofing substrate (6).

Another subject of the present invention is a method for waterproofing a roof substrate, as shown in FIG. 6, comprising steps of:
  I) Applying a first sheet of a roofing membrane composite of the present invention to a surface of the roof substrate such that bottom major surface of the roofing membrane of said first sheet is facing the surface of the roof substrate,
  II) Applying a second sheet of a roofing membrane composite of the present invention to a surface the roof substrate such that bottom major surface of the roofing membrane of said second sheet is facing the surface of the roof substrate, and
  III) Removing the protective films from said first and second sheets.

The first and second sheets have been cut from the roofing membrane composite and preferably have the same width than the roofing membrane composite and a length that is typically several times the width of the sheet. Typically, the cutting step is conducted at the constructions site, shortly before the application to the surface of the roof substrate.

The further steps of the installation method depend on the type of joints that are formed between adjacent sheets, i.e., whether the sheets are positioned to form butt joints or overlapping joints. The butt joints have to be sealed to ensure watertightness of the roof system by using sealing strips, which form a bridge between the edge portions of the abutted sheets. The sealing strips can then be adhered to the edge portions of the sheets by using, for example, adhesive bonding or heat-welding means. Overlapping joints can be directly sealed by joining the opposite surfaces of the overlapped edge portions to each other, preferably by using adhesive bonding or heat-welding means.

According to one or more embodiments, said first and second sheets of the roofing membrane composite are applied to the surface of the roof substrate in steps I) and II) to form butt joints along the long or short edges of said first and second sheets.

According to one or more embodiments, the said second sheet of the roofing membrane composite is applied to the surface of the roof substrate such that a second edge portion of said second sheet of the roofing membrane composite is overlapping a first edge portion of said first sheet to form an overlapping joint, wherein the method preferably comprises a further step of adhering the first edge portion of said first sheet to the second edge portion of said second sheet using adhesive bonding or heat-welding means, preferably heat-welding means.

The heat-welding step preferably comprises heating the first edge portion of said first sheet to the second edge portion of said second sheet slightly above the melting temperature of the roofing membrane and seaming the edge portions under sufficient pressure to provide acceptable seam strength without use of adhesive.

The heat-welding step can be conducted manually, for example by using a hot air tool, or by using an automatic welding device, such as an automatic hot-air welding device, for example Sarnamatic® 661 welding device. The temperature to which the edge portions are heated depends on the embodiment of the roofing membrane composite and also whether the welding step is conducted manually or by using an automatic welding device. Preferably, the edge portions of said first and second sheets in the overlapping areas are heated to a temperature of at or above 150° C., more preferably at or above 200° C.

In case the roofing membrane composite is not provided with a selvage edge, i.e., with an edge portion of the roofing membrane that is not covered with the protective film, and the first and second sheets are applied to the roof substrate to form an overlapping joint, the method preferably comprises a further step of removing a portion of the protective film of said first sheet exposing the top major surface of the roofing membrane in the area of the first edge portion before said second sheet is applied in step II) to form the overlapping joint. However, it may be preferred to use sheets of a roofing membrane composite having one or more selvage edges, since the presence of the selvage edges enables conducting the installation method with reduced number of steps.

Should the roofing membrane composite be only provided with longitudinal selvage edges, the protective film must be only removed when an overlapping joint is formed between the short edge portions of sheets of the roofing membrane composite. It is also possible, although not necessarily preferred, to apply said second sheet to the surface of the roof substrate to form an overlapping joint between the long edge portions of said first and second sheets and then to apply a third sheet of the roofing membrane composite to form a butt joint between the short edge portions of said second and third sheets. The advantage of using a combination of overlapping and butt joints is that none of the edge portions of the protective films have to be removed before sealing of the membrane joints, which simplifies the installation process.

In step III) of the method, the protective films are entirely removed from said first and second sheets of the roofing membrane composite to expose the top major surface of the roofing membrane. Preferably, the protective films are not removed until the roofing work is finished to protect the roofing membranes during the installation process from environmental impacts, particularly from fouling and mechanical impacts. The removed pieces of the protective film can be collected and send to a recycling facility.

The roofing membranes can be adhered to the roof substrate using any conventional means, for example, by mechanical fastening means, such as by using screws and/or barbed plates, or by adhesive bonding means, such as contact bonding adhesives. Furthermore, the roofing membrane can be a self-adhering membrane having a layer of pressure sensitive adhesive coated on the bottom major surface of the membrane.

The term "pressure sensitive adhesive (PSA)" designates in the present disclosure viscoelastic materials, which adhere immediately to almost any kind of substrates by application of light pressure, and which are permanently tacky. The tackiness of an adhesive layer can be measured, for example, as a loop tack.

Suitable pressure sensitive adhesives for use in a self-adhering roofing membrane include, for example, acrylic adhesives and synthetic rubber-, natural rubber-, and bitumen-based adhesives. In addition to the basic polymer constituent, suitable pressure sensitive adhesives typically comprise one or more additional constituents including, for example, tackifying resins, waxes, and additives, for example, UV-light absorption agents, UV- and heat stabilizers, optical brighteners, pigments, dyes, and desiccants.

The roof substrate can be any conventions substrate, such as a metal, concrete, or fiber reinforced concrete roof deck, or an insulation board, a cover board, or an existing roofing membrane.

The invention claimed is:

1. A roofing membrane composite comprising:
    a) a roofing membrane and
    b) a protective film removably affixed to a top major surface of the roofing membrane without an adhesive layer between the protective film and the roofing membrane,
    wherein the protective film comprises at least one layer, the at least one layer includes at least one polyolefin, and at least one of a long edge portion and at least one short edge portion of the roofing membrane is not covered with the protective film.

2. The roofing membrane composite according to claim 1, wherein an interlayer peel strength between the protective film and the roofing membrane determined according to ISO 11339:2010 standard is not more than 15 N/50 mm and/or at least 0.5 N/50 mm.

3. The membrane composite according to claim 1, wherein the protective film comprises a contact layer comprising at least 50 wt.-% based on a total weight of the contact layer, of at least one ethylene-based polymer, wherein the contact layer is directly connected over at least a portion of a bottom major surface of the contact layer to the top major surface of the roofing membrane.

4. The membrane composite according to claim 1, wherein the protective film comprises at least two layers.

5. The membrane composite according to claim 1, wherein each layer of the protective film comprises at least one polyolefin.

6. The membrane composite according to claim 1, wherein the protective film has a thickness of 10-200 m and/or a width of 0.5-5 m.

7. The membrane composite according to claim 1, wherein the roofing membrane comprises at least one polymer selected from polyvinylchloride, polyolefin, halogenated polyolefin, rubber, and ketone ethylene ester.

8. The membrane composite according to claim 1, wherein the roofing membrane comprises at least at least 35 wt.-% based on a total weight of the roofing membrane, of at least one polymer selected from polyvinylchloride, polyolefin, halogenated polyolefin, rubber, and ketone ethylene ester.

9. The membrane composite according to claim 1, wherein the roofing membrane has a thickness of 0.5-5 mm.

10. A method for producing a roofing membrane composite according to claim 1 comprising:
thermally laminating a protective film to all or part of a top major surface of a roofing membrane in a manner that gives direct bonding between the protective film and the roofing membrane or
extruding or co-extruding a melt-processed composition of a roofing membrane onto a surface of a protective film.

11. A method for waterproofing a roof substrate comprising:
I) applying a first sheet of a roofing membrane composite according to claim 1 to a surface of the roof substrate such that the bottom major surface of the roofing membrane of said first sheet is facing the surface of the roof substrate,
II) applying a second sheet of the roofing membrane composite the surface of the roof substrate such that the bottom major surface of the roofing membrane of said second sheet is facing the surface of the roof substrate, and
III) removing the protective films from said first and second sheets.

12. The method according to claim 11, wherein said first and second sheets are applied to the surface of the roof substrate to form butt joints along a long or a short edge of said first and second sheets.

13. The method according to claim 11, wherein said second sheet is applied to the surface of the roof substrate such that a second edge portion of said second sheet is overlapping a first edge portion of said first sheet to form an overlapping joint.

14. The method according to claim 13 comprising a further step of adhering the first edge portion of said first sheet to the second edge portion of said second sheet using heat-welding or adhesive bonding means.

* * * * *